United States Patent
Tsai et al.

(10) Patent No.: US 9,250,659 B2
(45) Date of Patent: Feb. 2, 2016

(54) DOOR ASSEMBLY

(71) Applicant: HEWLETT-PACKARD DEVELOPMENT COMPANY, L.P., Houston, TX (US)

(72) Inventors: Chia-Ming Tsai, Taipei (TW); Jeffrey A. Lev, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 334 days.

(21) Appl. No.: 13/627,160

(22) Filed: Sep. 26, 2012

(65) Prior Publication Data
US 2014/0084770 A1  Mar. 27, 2014

(51) Int. Cl.
| | |
|---|---|
| A47B 81/00 | (2006.01) |
| A47B 97/00 | (2006.01) |
| G06F 1/16 | (2006.01) |
| G06F 1/18 | (2006.01) |
| H04M 1/02 | (2006.01) |

(52) U.S. Cl.
CPC .............. G06F 1/1679 (2013.01); G06F 1/181 (2013.01); H04M 1/0274 (2013.01)

(58) Field of Classification Search
CPC ............. H04M 1/0262; H04M 1/0274; H05K 9/0067; H05F 3/02; G06F 1/181; G06F 1/1679; B65D 45/20; B65D 45/22; B65D 45/16
USPC .......... 312/223.1, 223.2, 223.6, 265.6; 292/1, 292/DIG. 11, DIG. 63, 80, 85, 86; 194/256, 194/251, 253, 257; 220/326, 324, 315, 827, 220/810, 254.5, 254.3, 254.1, 259.1, 256.1; 361/679.3, 679.56, 679.58; 49/209, 49/211
See application file for complete search history.

(56) References Cited

U.S. PATENT DOCUMENTS

| | | | | |
|---|---|---|---|---|
| 2,735,740 | A * | 2/1956 | Soans ........................... | 312/234 |
| 4,722,025 | A * | 1/1988 | Robinson ..................... | 361/212 |
| 4,989,622 | A * | 2/1991 | Kozuka et al. ............... | 132/301 |
| 5,526,926 | A * | 6/1996 | Deja ........................... | 206/308.1 |
| 6,189,938 | B1 * | 2/2001 | Nakadaira et al. ............. | 292/87 |
| 6,659,516 | B2 * | 12/2003 | Wang et al. ................. | 292/251.5 |
| 6,671,160 | B2 * | 12/2003 | Hayden ........................ | 361/212 |
| 6,761,421 | B2 | 7/2004 | Chen et al. | |
| 6,816,448 | B2 | 11/2004 | Lee | |
| 6,991,490 | B1 * | 1/2006 | Su ................................ | 439/521 |
| 7,611,371 | B2 * | 11/2009 | Guo ............................. | 439/367 |
| 7,679,897 | B2 | 3/2010 | Xu et al. | |

(Continued)

FOREIGN PATENT DOCUMENTS

CN  2607617  3/2004

*Primary Examiner* — Daniel J Troy
*Assistant Examiner* — Andres F Gallego
(74) *Attorney, Agent, or Firm* — HP Legal Department

(57) ABSTRACT

A door assembly for use with a computing device that includes a housing that defines an opening to an interior of the housing. The door assembly also includes a cover positionable over the opening in a secure closed position to help prohibit access to the interior of the housing and away from the opening in an open position to allow access to the interior of the housing. The door assembly also includes a flange assembly connected to the cover and coupled to the housing to translate within a cavity in the housing and create a hinge about which the cover moves from the closed position to the open position. The door assembly further includes an opening mechanism to release the cover from the secure closed position to the open position.

18 Claims, 7 Drawing Sheets

(56) References Cited

U.S. PATENT DOCUMENTS

| | | |
|---|---|---|
| 7,712,627 B2 | 5/2010 | Yang et al. |
| 2004/0205783 A1 | 10/2004 | Ting et al. |
| 2011/0069429 A1* | 3/2011 | Zhu .......................... 361/679.01 |
| 2011/0211318 A1* | 9/2011 | Ouyang ........................ 361/752 |

* cited by examiner

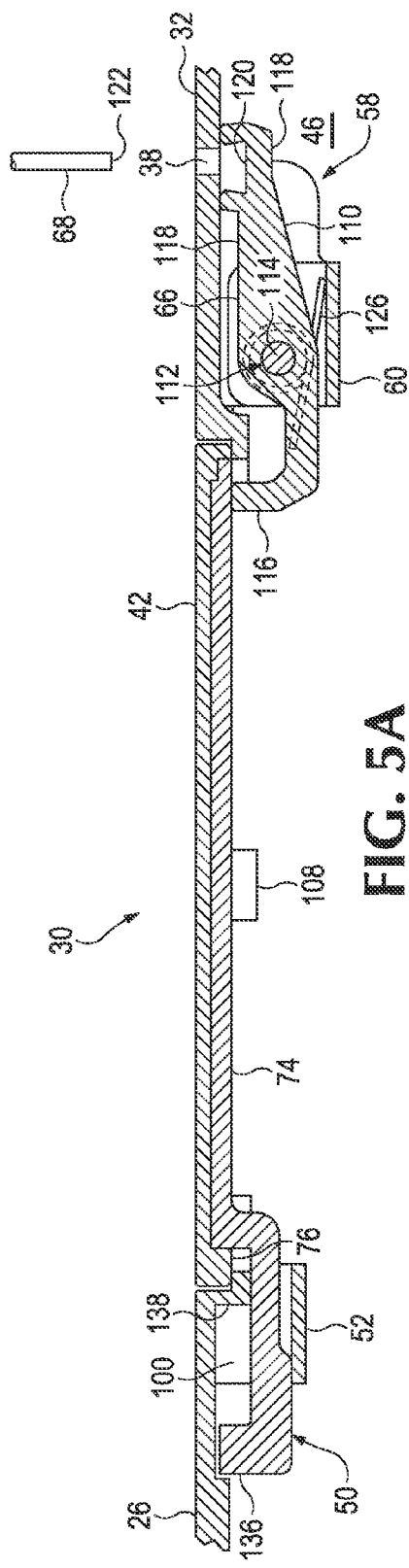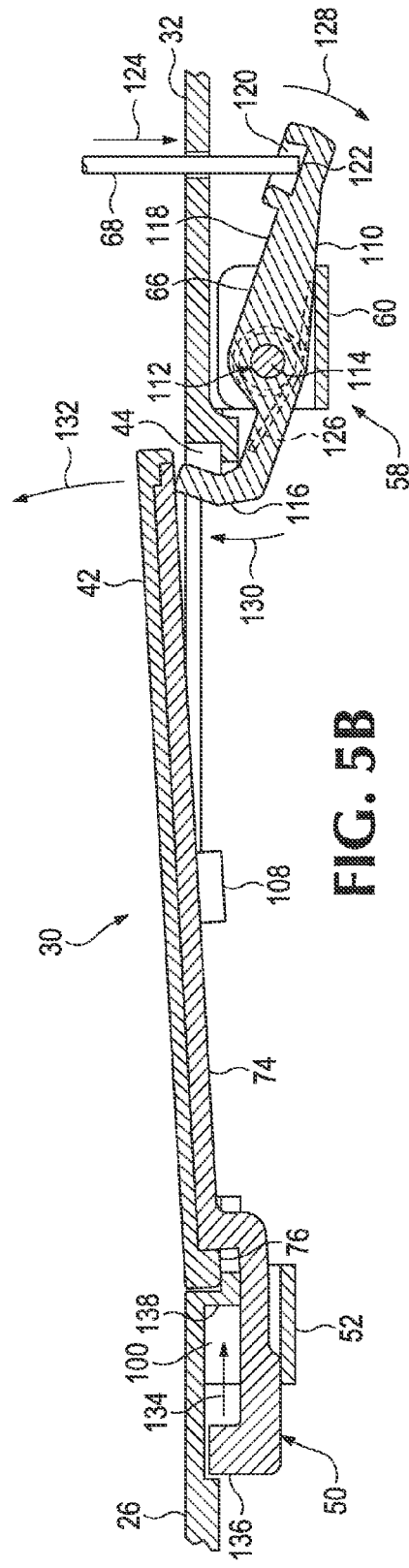

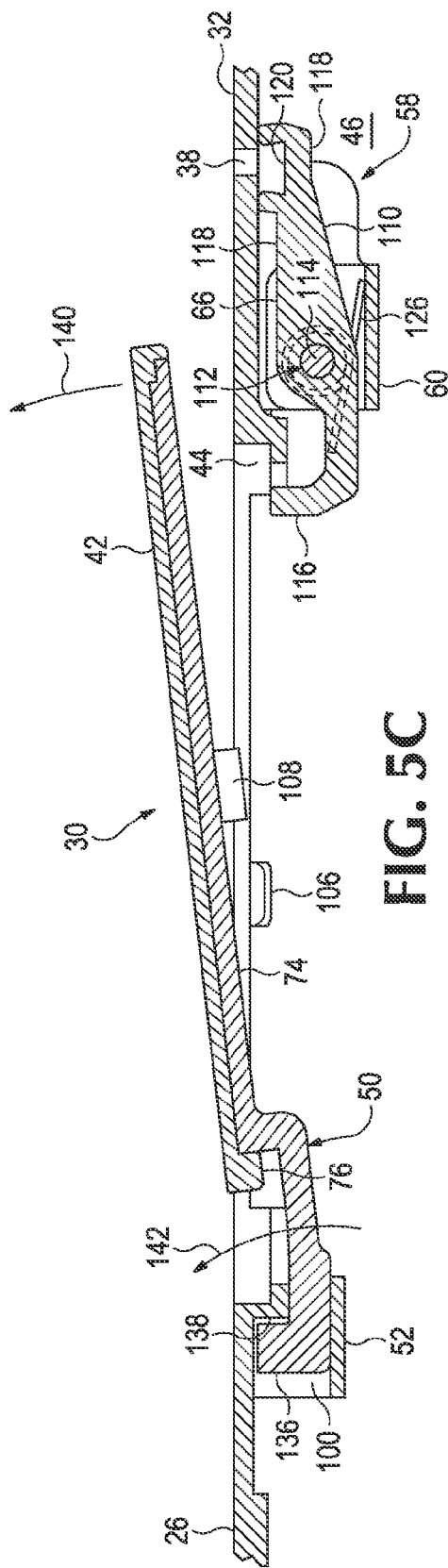
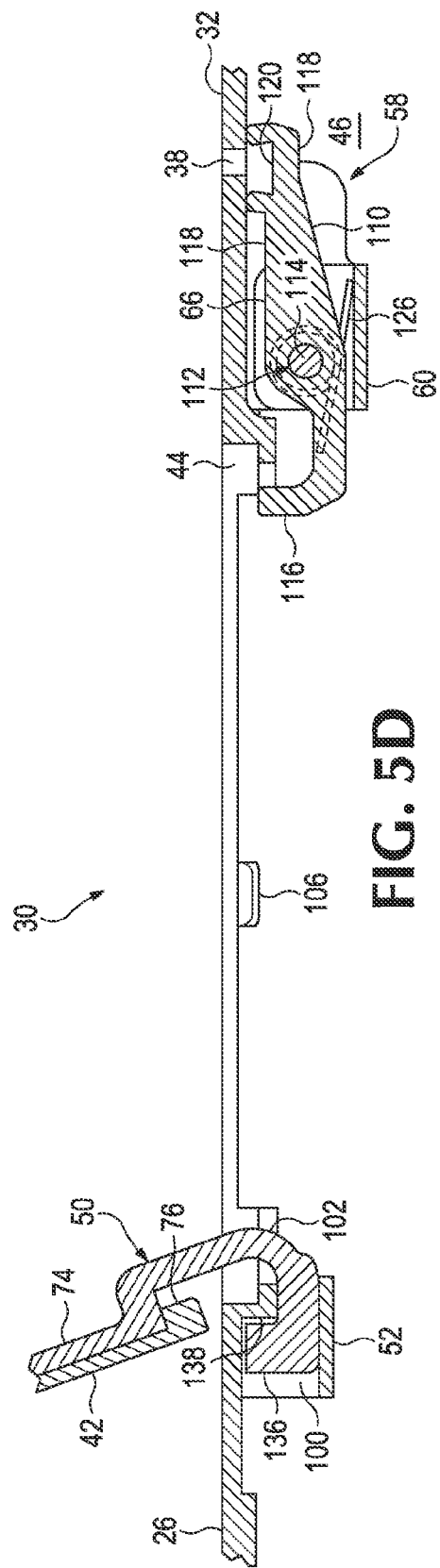

DOOR ASSEMBLY

BACKGROUND

Consumers appreciate aesthetically pleasing computing devices that are cost effective. They also appreciate the ability to add features and functionality to their computing devices by connecting accessories and peripherals to their computing devices. Businesses may, therefore, endeavor to provide such computing to these consumers.

BRIEF DESCRIPTION OF THE DRAWINGS

The following detailed description references the drawings, wherein:

FIGS. 5A-5D are example views of the operation of the door assembly taken along line 5-5 of FIG. 3.

DETAILED DESCRIPTION

Computing devices are ubiquitous. Designers and manufacturers of such devices look for ways to help differentiate their designs from those of their competitors. One way in which to do this is to make computing devices attractive to consumers. This can be accomplished in a variety of ways including making door assemblies used to cover connectors, plugs, sockets, and other access ports unobtrusive.

Figure 1:
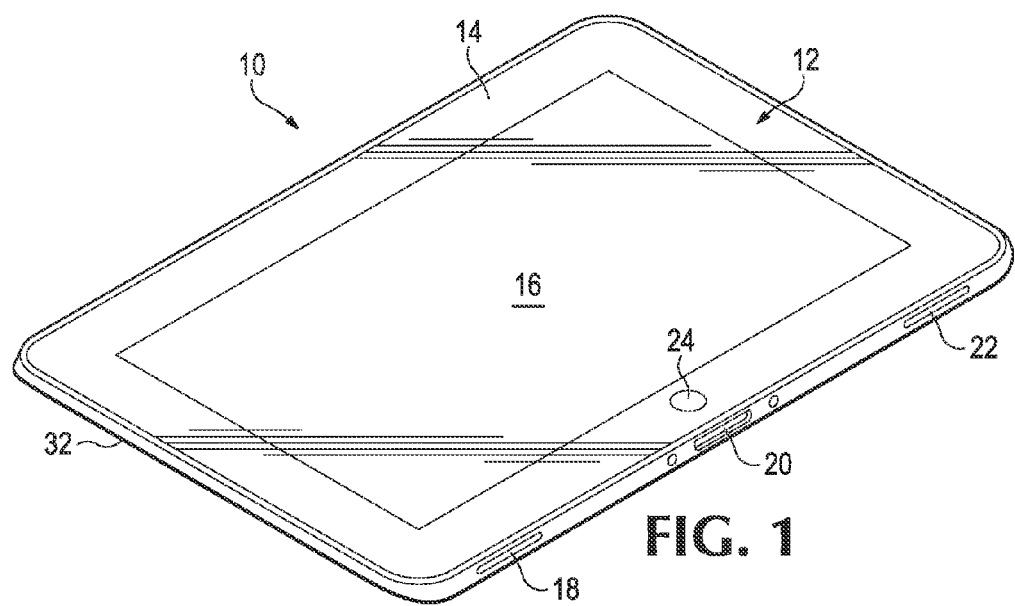
FIG. 1 is an example of a computing device that includes a pair of door assemblies.

Another way in which this can be accomplished is to make such doors easy to open without utilizing complicated and/or expensive mechanisms which can break and add to the cost of a computing device. An example of a computing device 10 that includes a door assembly directed to achieving these objectives is shown in FIG. 1.

As used herein, "computing device" is defined as including, but not necessarily being limited to, a computer, server, phone, tablet, personal digital assistant, peripheral, gaming device, video player, audio player, television, television controller, document repository, storage array, or other similar item. A computing device may be "stand-alone", independent, dependent, or networked. Additionally, a computing device may run or control one or more services (as a host) to serve the needs of users of other devices on a network. Examples include, but are not limited to, a database server, file server, mail server, print server, web server, gaming server, etc.

Referring again to FIG. 1, computing device 10 includes a tablet 12 having a front surface 14 that includes a screen 16. Tablet 12 also includes a power port 18 for recharging a battery of tablet 12 or running it directly from a power source, a volume control switch 20 for adjusting the volume of audio output, and a power switch 22 for turning computing device 10 on and off. Tablet 12 also includes a control button that may be part of a user interface of computing device 10.

Figure 2:
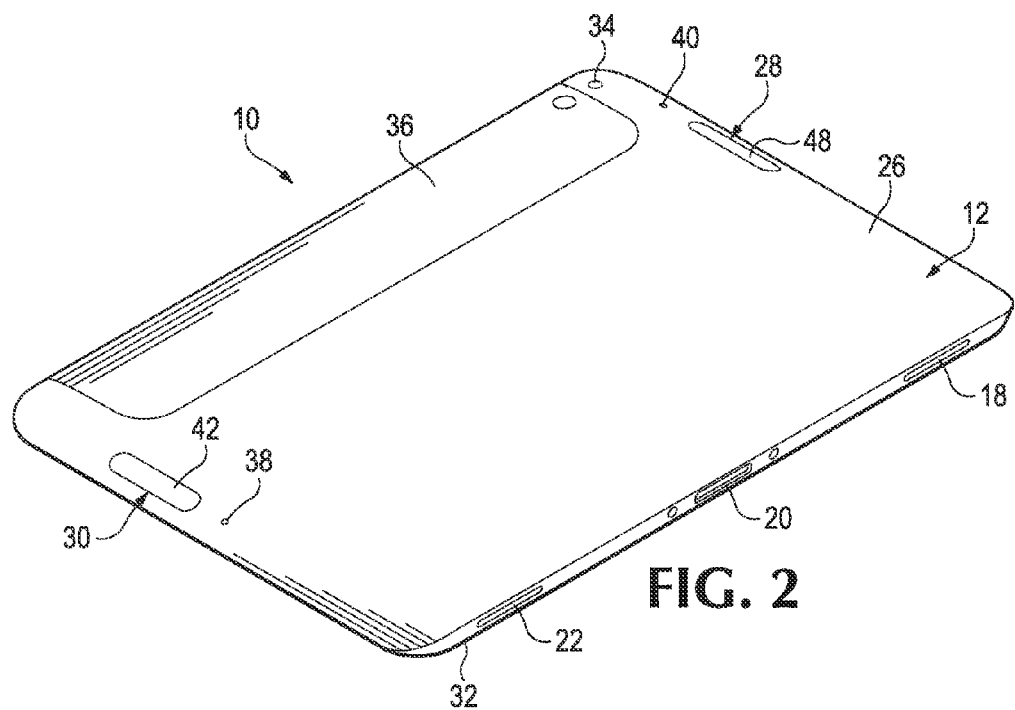
FIG. 2 is another view of the computing device of FIG. 1 that includes the pair of door assemblies.

Another view of computing device 10 is illustrated in FIG. 2. As can be seen in FIG. 2, computing device 10 includes aback surface or back side 26 that includes a pair of example door assemblies 28 and 30. Example door assemblies 28 and 30 provide access to an interior of housing 32 where connectors, plugs, sockets or ports may be located for attachment of accessories and peripherals (antenna, radio, additional memory, SIMM cards, keyboard, printer, etc.) to enhance or otherwise supplement the functionality of computing device 10. Access to the interior of housing 32 may also allow repair to components or elements of computing device 10. As can also be seen in FIG. 2, door assemblies 28 and 30 create an aesthetically pleasing appearance for tablet 12 of computing device 10 in their closed positions by integrating and blending with the overall shape and design of tablet 12.

As can also be seen in FIG. 2, tablet 12 includes a camera 34 that allows pictures and/or video to be taken and/or recorded by computing device 10. As can also be seen in FIG. 2, tablet 12 includes battery compartment 36 which allows access to and replacement of a rechargeable battery, if necessary. As can further be seen in FIG. 2, computing device 10 additional includes an aperture 38 defined by housing 32 through which an opening member is inserted to manually actuate door assembly 30, as discussed in more detail below. Computing device 10 also includes an aperture 40 defined by housing 32 through which the opening member may be inserted to manually actuate door assembly 28.

Figure 3:
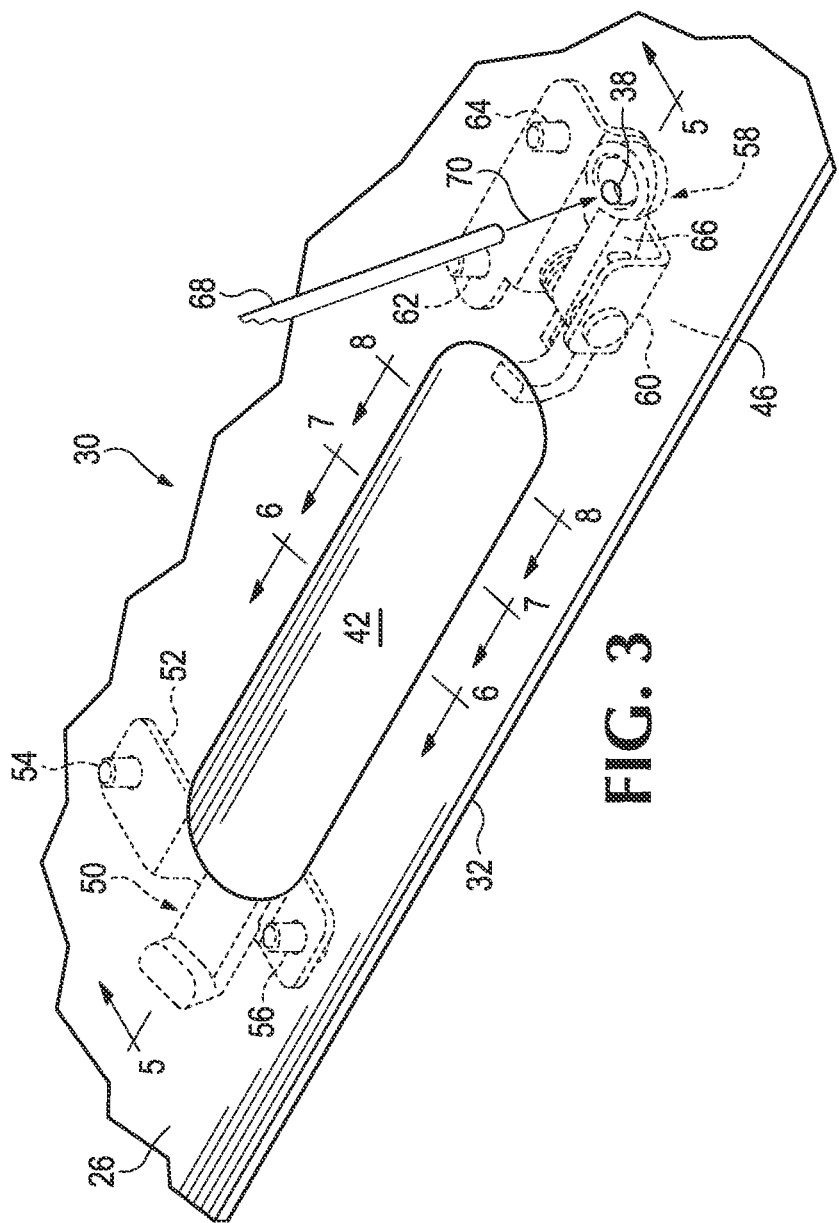
FIG. 3 is an example of a perspective view of a door assembly

A perspective view of an example of door assembly 30 is shown in FIG. 3. As can be seen in FIG. 3, door assembly 30 includes a cover 42 positionable over an opening 44 (see FIG. 4) defined by housing 32. Opening 44 provides access to an interior 46 of housing 32, as discussed more fully below. As can be seen in FIG. 2, door assembly 28 includes a cover 48 as well. The following discussion of the components, elements, operation, and functionality of door assembly 30 is equally applicable to door assembly 28.

Referring again to FIG. 3, cover 42 is positionable over opening 44 in a secure closed position to help prohibit access to interior 46 of housing 32. This helps to protect interior 46 and components therein from damage, debris, and moisture. As can be seen in FIG. 3, door assembly 30 also includes a flange assembly 50 connected to cover 42 and coupled to housing 32 by a bracket 52 that is connected to housing 32 by a pair of fasteners 54 and 56.

Figure 4:
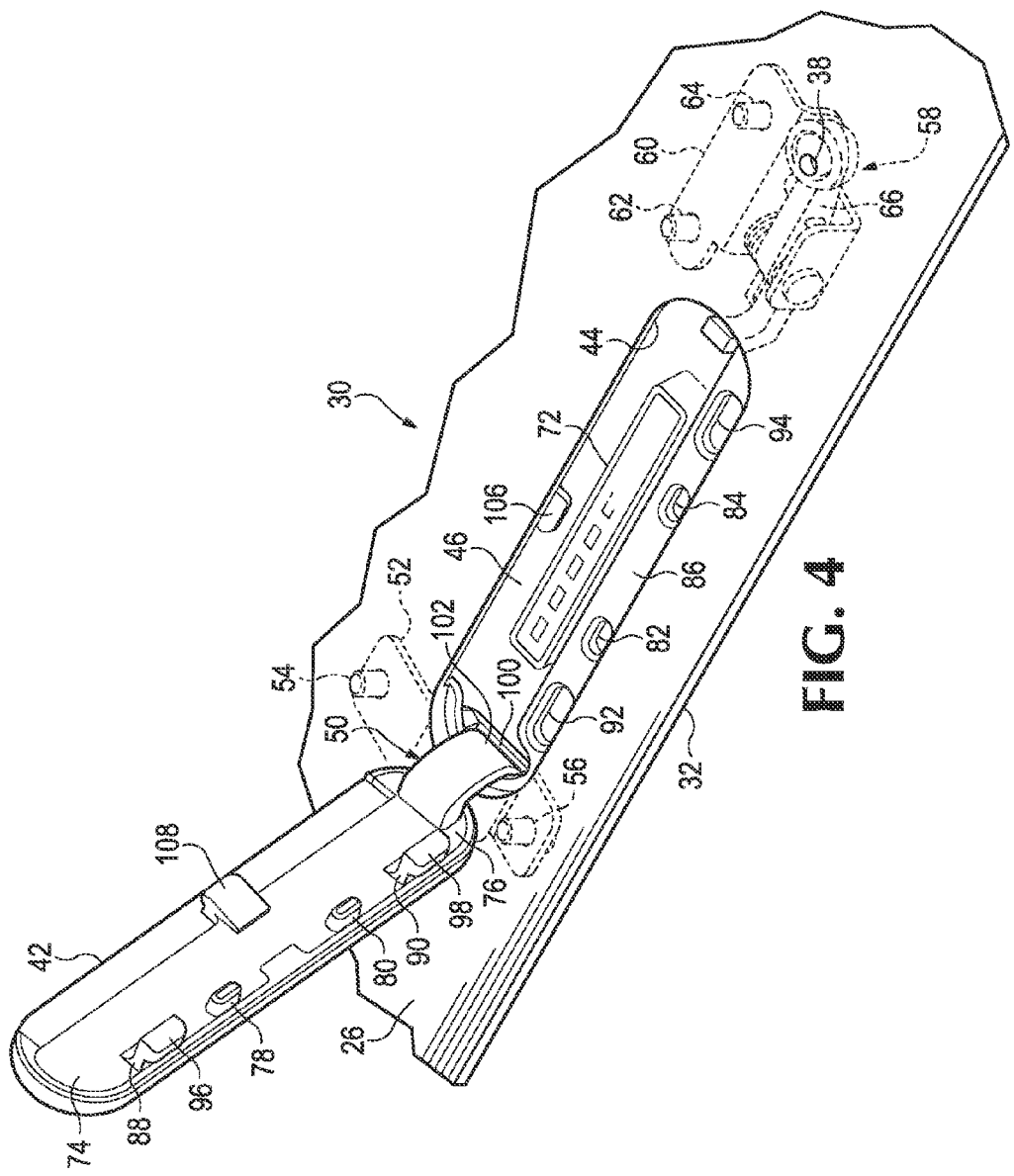
FIG. 4 is an example of another perspective view of the door assembly of FIG. 3.

As can also be seen in FIG. 3, door assembly 30 includes an opening mechanism 58 to release cover 42 from the secure closed position to an open position, as shown, for example, in FIG. 4. Opening mechanism 58 is also coupled to housing 32 by a bracket 60 that is connected to housing 32 by a pair of fasteners 62 and 64. Opening mechanism 58 includes a manually actuated trigger device 66 that is manually actuated by opening member 68 which is inserted into aperture 38 in the direction of arrow 70. As discussed more fully below, this actuation by opening member 68 causes trigger device 66 to release cover 42 from the secure closed position shown in FIG. 3 to the open position shown, for example, in FIG. 4.

In one or more examples of door assembly 30, cover 42 may be made from metal (such as aluminum), rubber, or plastic and flange assembly 50 may be made from an elastomeric material (such as rubber). Brackets 52 and 60 may be made from metal, rubber, or plastic and fasteners 54, 56, 62 and 64 may also be made from metal or plastic. Opening mechanism 58 may be made from any suitable material such as plastic, metal or a combination thereof.

A perspective view of door assembly 30 in an open position is shown in FIG. 4. As can be seen in FIG. 4, in this open position of door assembly 30, access to a diagrammatically illustrated connector, plug, port or socket 72 located in interior 46 of housing 32 is provided. Connector, plug, port or socket 72 allows one or more accessories and/or cards to be connected or coupled to computing device 10 to enhance its features and functionality. As can also be seen in FIG. 4, door assembly 30 includes a member 74 connected to bottom 76 of cover 42 along with flange assembly 50. In one or more examples of door assembly 30, member 74 may be made from an elastomeric material (Such as rubber) to help provide a seal against dirt, debris, and moisture when cover 42 is in a closed position, as shown, for example, in FIG. 3.

Referring again to FIG. 4, member 74 includes alignment members 78 and 80 that help orient cover 42 over opening 44 in the closed position. In this example, this is accomplished by disposing alignment members 78 and 80 into respective apertures 82 and 84 defined by or in bracket 86, as shown. Bracket 86 is connected to interior 46 of housing 32 and may be made from any of a variety of materials such as metal or plastic. As can also be seen in FIG. 4, member 74 also includes locking members 88 and 90 to help secure cover 42 over opening 44 in the closed position. In this example, this is accomplished by disposing locking members 88 and 90 into respective apertures 92 and 94 defined by or in bracket 86, as shown, to engage respective hooks 96 and 98 with bracket 86.

As can additionally be seen in FIG. 4, flange assembly 50 is disposed in a cavity 100 defined by housing 32 and bracket 52. This arrangement allows flange assembly 50 to translate within cavity 100 when cover 42 of door assembly 30 is moved from the secure closed position shown in FIG. 3 to the open position shown in FIG. 4, as discussed more fully below. Flange assembly 50 creates a hinge or joint 102 about which cover 42 moves from the closed position shown in FIG. 3 to the open position shown in FIG. 4. Flange assembly 50 also allows cover to remain attached to tablet 12 of computing device 10 when open, helping to prevent it from getting lost.

As can further be seen in FIG. 4, the illustrated example of door assembly 30 has a tab assembly 104 (see FIG. 6) that includes a tab 106 formed on or connected to housing 32 and a hook 108 formed on or connected to bottom 76 of cover 42 that releasably engages tab 106. Tab assembly 104 helps to secure cover 42 over opening 44 in the closed position, shown, for example, in FIG. 3. Although not shown, it is to be understood that other examples of door assembly 30 may omit tab assembly 104 and rely instead locking members 88 and 90. Alternatively, other examples of door assembly 30 may omit on locking members 88 and 90 and rely of tab assembly 104 instead. Tab assembly 104 may be made from any suitable material including, for example, plastic, metal, or a combination of the two.

Examples of the operation or functioning of door assembly 30 are illustrated in FIGS. 5A-5D which are taken along line 5-5 of FIG. 3. As can be seen in FIGS. 5A-5D, in this example of door assembly 30, flange assembly 50 and member 74 are a one piece structure. It is to be understood, however, that in other examples of door assembly 30, flange assembly 50 and member 74 may be separate structures.

Referring specifically to FIG. 5A, manually actuated trigger device 66 of opening mechanism 58 includes a lever 110 in interior 46 of housing 32 and a pivot 112 coupled to housing 32 via pin 114 which is attached to bracket 60. Trigger device 66 also includes a lifting member 116 adjacent cover 42 and an arm 118 coupled to lifting member 116.

Referring now to FIG. 5B, arm 118 includes a cup 120 that receives opening member 68, as shown, once it is inserted through aperture 38. Once end 122 of opening member 68 is disposed in cup 120 and moved in the direction indicated by arrow 122 by a manual force, this applied manual force eventually overcomes a force applied by biasing member 126 to actuate trigger device 66 of opening mechanism 58. Upon such actuation, arm 118 rotates about pivot 112 in the general direction indicated by arrow 128. This causes lifting member 116 to move in the general direction indicated by arrow 130 which engages lifting member 116 against member 74 connected to cover 42, thereby moving cover 42 in the direction generally indicated by arrow 132, releasing cover 42 from the secure closed position.

Next, flange assembly 50 is translated within cavity in a direction indicated by arrow 134 to continue the movement of cover 42 to the open position. As illustrated FIG. 5C, this translation eventually stops due to engagement or contact between end portion 136 of flange assembly 50 and wall 138 of housing 32. During this translation of flange assembly 50 within cavity 100 from the position shown in FIG. 5B to that shown in FIG. 5c, or after it is completed, cover 42 is simultaneously or subsequently manually moved in the general direction of arrow 140 around hinge or joint 102, as generally indicated by arrow 142. This movement results in cover assuming a fully open position illustrated in FIG. 5D which allows access to interior 46 of housing 32.

As can be seen in FIGS. 5C and 5D, biasing member 126 provides a force that urges lever 110 of trigger device 66 to remain in the unactuated position shown. That is, upon removal of opening member 68 from cup 120 of arm 118, biasing member 126 returns lever 110 of trigger device 66 from the actuated position shown in FIG. 5B to the unactuated position shown, for example, in FIGS. 5C and 5D.

Figure 6:
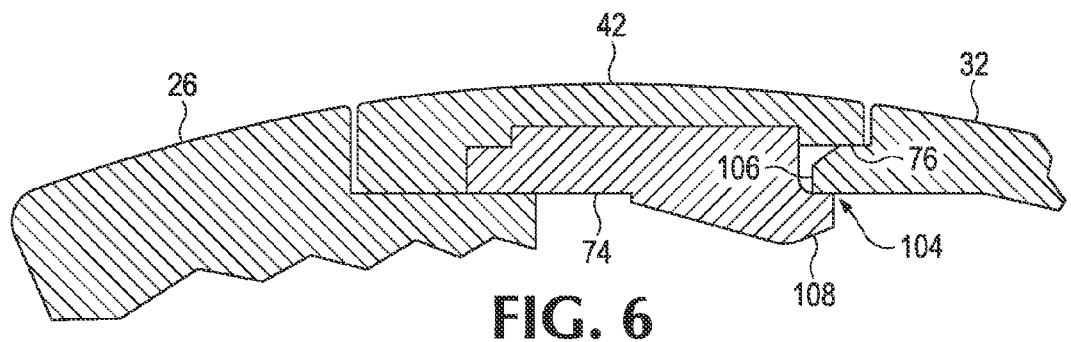
FIG. 6 is an example view of the door assembly taken along line 6-6 of FIG. 3.

An example view of door assembly 30 taken along line 6-6 of FIG. 3 is shown in FIG. 6, As can be seen in FIG. 6, tab 106 and hook 108 of tab assembly 104 are engaged to help secure cover 42 in the closed position shown.

Figure 7:
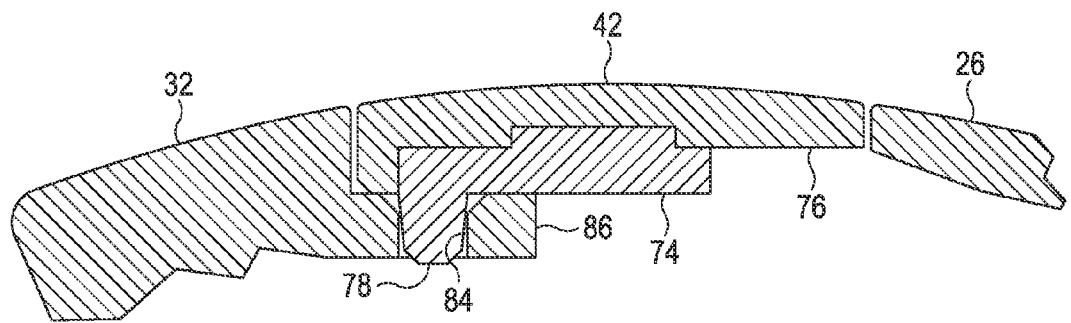
FIG. 7 is an example view of the door assembly taken along line 7-7 of FIG. 3.

An example view of door assembly 30 taken along 7-7 of FIG. 3 is shown in FIG. 7. As can be seen in FIG. 7, alignment member 78 is inserted in aperture 84 of bracket 86 to help orient cover 42 over opening 44 in the secure closed position.

Figure 8:
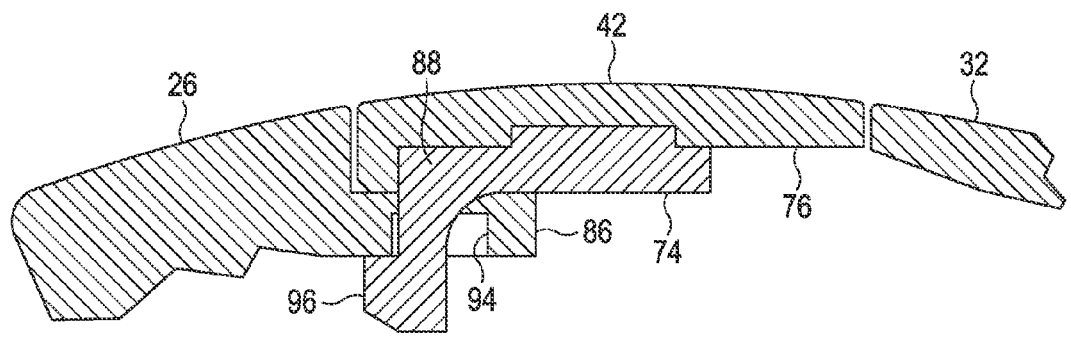
FIG. 8 is an example view of the door assembly taken along line 8-8 of FIG. 3.

An example view door assembly 30 taken along line 8-8 of FIG. 3 is shown in FIG. 8. As can be seen in FIG. 8, hook 96 of locking member 88 is disposed in aperture 94 of bracket 86. This allows hook 96 to releasably engage housing 32 to help secure cover 43 over opening 44 in the closed position.

Figure 9:
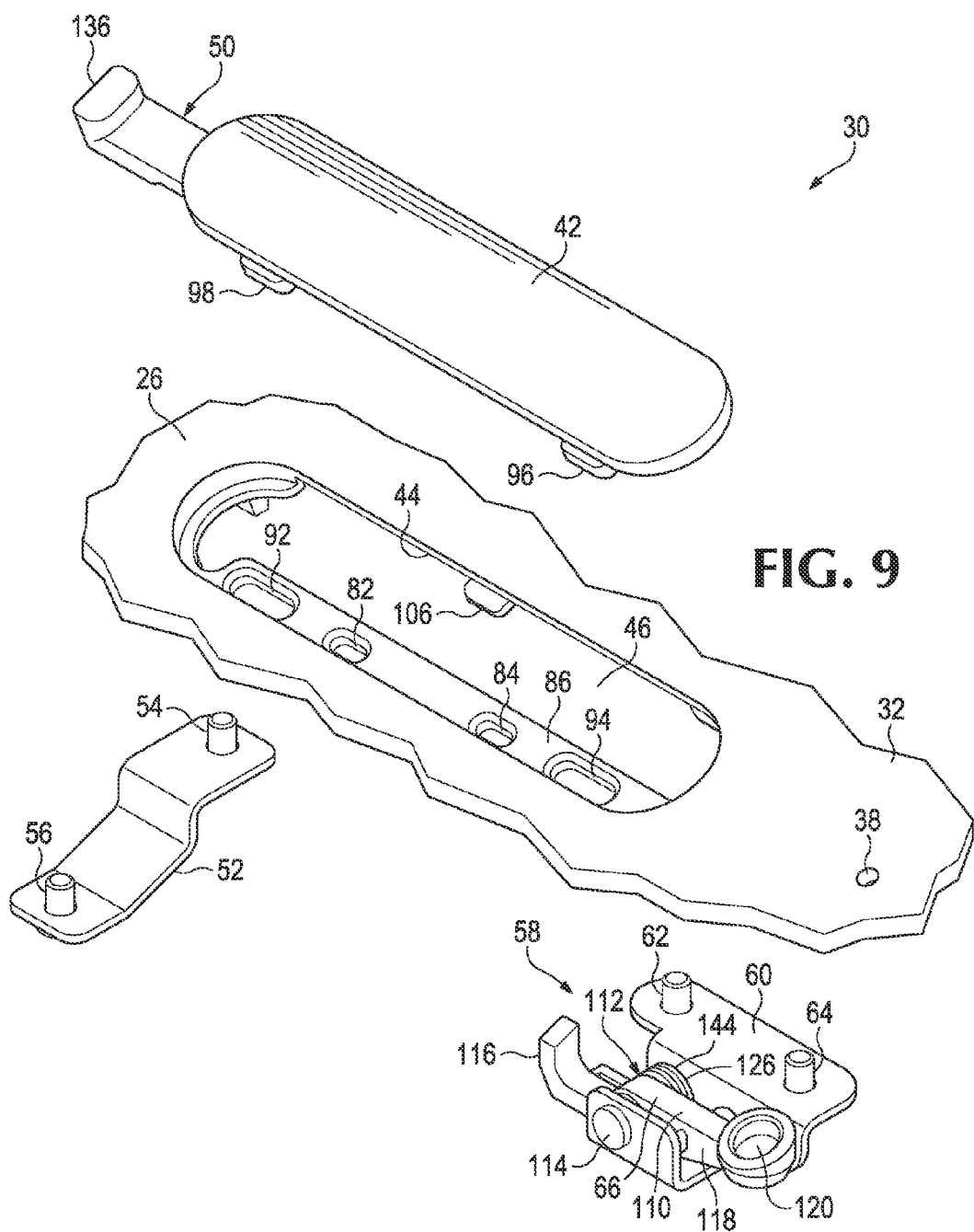
FIG. 9 is an exploded perspective view of the example door assembly of FIGS. 3 and 4.

An exploded perspective view of door assembly 30 is shown in FIG. 9. As can be seen in FIG. 9, in this illustrated example of door assembly 30, biasing member 126 includes a coil Spring 144 disposed about pin or shaft 114. Although not shown, it is to be understood that in other examples of door assembly 30, biasing member 126 may utilize other or additional components as well. For example, a leaf spring (not shown) may be used instead of coil spring 144.

Although several examples have been described and illustrated in detail, it is to be clearly understood that the same are intended by way of illustration and example only. These examples are not intended to be exhaustive or to limit the invention to the precise form or to the exemplary embodiments disclosed. Modifications and variations may well be apparent to those of ordinary skill in the art. The spirit and scope of the present invention are to be limited only by the terms of the following claims.

Additionally, reference to an element in the singular is not intended to mean one and only one, unless explicitly so stated, but rather means one or more. Moreover, no element or component is intended to be dedicated to the public regardless of whether the element or component is explicitly recited in the following claims.

What is claimed is:

1. A door assembly for use with a computing device comprising:
   a housing that defines an opening to an interior of the housing;
   a cover positionable over the opening in a secure closed position to help prohibit access to the interior of the housing and away from the opening in an open position to allow access to the interior of the housing;
   a flange assembly connected to the cover and coupled to the housing to linearly translate within a cavity in the housing and create a hinge about which the cover moves from the closed position to the open position; and
      an opening mechanism positioned in the interior of the housing to release the cover from the secure closed position to the open position, wherein the cover extends along a face of the housing and wherein the opening mechanism comprises a lifting member that lifts the cover from the opening and being manually engageable along the same face of the housing, wherein the opening mechanism further comprises:
   a lever coupled to the lifting member and pivotable about a fixed axis to pivot the lifting member against the cover to lift the cover, wherein the lifting member is on a first side of the axis and the lever is on a second side of the axis opposite the first side; and
   wherein the housing defines an aperture through which an opening member, independent and separate of the door assembly, has an end insertable into the aperture and movable in a first direction to manually actuate the opening mechanism to lift the cover in a second direction opposite to and parallel to the first direction, wherein the lever is positioned below the aperture.

2. The door assembly of claim 1, wherein the cover also translates within the cavity in the housing and moves about the hinge from the open position to the closed position.

3. The door assembly of claim 1, wherein the flange assembly maintains coupling of the cover to the housing in the open position.

4. The door assembly of claim 1, further comprising a computing device.

5. The door assembly of claim 1, further comprising a member connected to the cover that includes an alignment member to help orient the cover over the opening in the closed position.

6. The door assembly of claim 1, further comprising a member connected to the cover that includes a locking member to help secure the cover over the opening in the closed position.

7. The door assembly of claim 1, further comprising a tab assembly that helps to secure the cover over the opening in the closed position.

8. The door assembly of claim 1, wherein the opening mechanism includes a biasing member that provides a force that urges the lever to remain in an unactuated position and against which a manual force is applied to actuate the lifting member against the cover to release the cover from the secure closed position.

9. The door assembly of claim 1, wherein the housing defines the aperture on the first side of the axis.

10. The door assembly of claim 1, wherein the cover comprises a first edge proximate the lifting mechanism and a second edge opposite the first edge, the second edge being flush against edges of the opening.

11. A door assembly comprising:
   a housing that defines an opening to an interior of the housing;
   a cover positionable over the opening in a secure closed position to help prohibit access to the interior of the housing and away from the opening in an open position to allow access to the interior of the housing;
   a flange assembly connected to the cover and coupled to the housing to translate within a cavity in the housing and create a hinge about which the cover moves from the closed position to the open position; and
   a lever, positioned in the interior of the housing, including a pivot having a fixed axis coupled to the housing, a lifting member adjacent the cover, and an arm coupled to the lifting member that rotates about the pivot upon manual actuation thereof to engage the lifting member against the cover to release the cover from the secure closed position, wherein the lever is depressable in a first direction to move the lifting member to lift the cover in a second direction opposite to the first direction, wherein the housing defines an unobstructed aperture through which an opening member, independent and separate from the door assembly, is insertable into the aperture to manually actuate the lever to release the cover from the secure closed position to the open position, wherein the opening mechanism defines an end insertable into the aperture to contact the arm positioned below the aperture.

12. The door assembly of claim 11, further comprising a biasing member that provides a force that urges the lever to remain in an unactuated position and against which a manual force is applied to actuate the lifting member against the cover to release the cover from the secure closed position.

13. The door assembly of claim 12, further comprising a member connected to the cover that includes an alignment member to help orient the cover over the opening in the closed position.

14. The door assembly of claim 11, wherein the cover also translates within the cavity in the housing and moves about the hinge from the open position to the closed position.

15. The door assembly of claim 11, wherein the flange assembly maintains coupling of the cover to the housing in the open position.

16. The door assembly of claim 11, further comprising a computing device.

17. The door assembly of claim 11, further comprising a member connected to the cover that includes a locking member to help secure the cover over the opening in the closed position.

18. The door assembly of claim 11, further comprising a tab assembly that helps to secure the cover over the opening in the closed position.

* * * * *